United States Patent [19]

Haines

[11] Patent Number: 4,524,794

[45] Date of Patent: Jun. 25, 1985

[54] AIR RELEASE AND ANTI-SIPHON VALVE

[76] Inventor: Frederick K. Haines, 1600 McKinley Ave., Woodland, Calif. 95695

[21] Appl. No.: 562,557

[22] Filed: Dec. 19, 1983

[51] Int. Cl.³ .............................................. F16K 31/22
[52] U.S. Cl. ..................................... 137/202; 137/423
[58] Field of Search ........................ 137/202, 423, 433

[56] References Cited

U.S. PATENT DOCUMENTS 2,111,473  3/1938  Hudson ............................... 137/202
3,168,103  2/1965  Kochaver ........................... 137/202
4,104,004  8/1978  Graef .............................. 137/202 X

FOREIGN PATENT DOCUMENTS 127939  5/1919  United Kingdom ................ 137/202

Primary Examiner—Alan Cohan
Attorney, Agent, or Firm—Lothrop & West

[57] ABSTRACT

For use at the apex of a pipe line adapted for air and water flow, there is a housing extending along a vertical axis and having an axial, bottom opening surrounded by a bottom valve seat and affording communication between the interior of the line and the interior of the housing. A similar axial, top opening surrounded by a top valve seat affords communication between the atmosphere and the interior of the housing. A first ball valve in the bottom portion of the housing can move onto and off of the bottom valve seat to control flow through the bottom opening. A second ball valve in the top portion of the housing can move onto and off of the top valve seat to control flow through the top opening. There are stops to limit the motion of the ball valves away from their respective valve seats. Also, there is a lever pivoted on the housing and extending into the pipe line for movement by liquid flow therein. The lever can dislodge the bottom ball valve from a position on the bottom valve seat.

1 Claim, 8 Drawing Figures

AIR RELEASE AND ANTI-SIPHON VALVE

BRIEF SUMMARY OF THE INVENTION

For controlling the admission of air to and release of air from the apex of an air and liquid line, a vertical housing at the apex of the line opens at the bottom to the line and at the top to the atmosphere. Two vertically spaced ball valves are restrained to limited axial movement in the housing to control flow into and from the bottom and top of the housing. A lever movably mounted on the housing responds to flow in the line and can dislodge the lower ball valve to permit special flow past that ball valve.

PRIOR ART

A search has disclosed the following U.S. Pat. Nos.:

431,542, Bailey, is in a related field with a comparable line environment, but primarily is an electric control for an electrically driven air exhaust pump.

U.S. Pat. No. 2,021,390, Smith et al., is in an unrelated field and shows a single ball anti-siphon valve for a water closet.

U.S. Pat. No. 2,363,313, Gavin, is in a related field but shows a reciprocating pump and siphon system for flow from a high level to a low level including a ball float valve and a disc valve, which latter may be operated by a ball float.

U.S. Pat. No. 2,502,211, Dyer, is a single ball valve vacuum breaker for a domestic washing machine, an unrelated field.

U.S. Pat. No. 2,254,069, Harris, is in a related field and shows a flow responsive lever operating a disc valve.

U.S. Pat. No. 2,686,528, Snyder, is in an unrelated field and includes no float or ball valve.

U.S. Pat. No. 3,011,510, Stanifird, is in an unrelated field and shows a single ball check valve.

DETAILED DESCRIPTION

Figure 1:
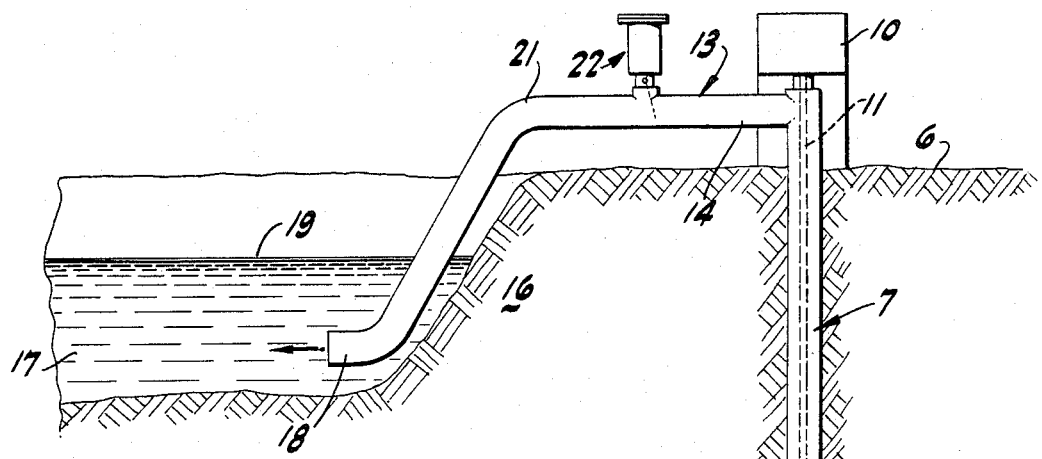
FIG. 1 is a diagrammatic showing, in cross-section on a vertical plane, of a line or pipe extending from a deep well to the surface of the ground and from there over an embankment and down into a water body much higher than the well, with a special valve pursuant to the invention at the apex of the pipe line.

There are many instances in which it is desirable to withdraw water, for example, from the bottom of a relatively deep well, canal, river or other water source and force the withdrawn liquid under pressure not only to the normal ground surface but over an embankment or levee into a body of water such as a river or pond disposed above the normal level of liquid in the well. This involves conducting liquid from the pump at the bottom of the well up through the well casing or pipe to and above the surface of the ground. The casing or pipe then continues over the top of the levee in an inverted U configuration with the other, discharge end of the pipe disposed below the open surface of the receiving body of water.

While this is effective when the pump is running for delivering well liquid into the receiving pond, yet when the pump is stopped with the pipe full of liquid the difference in elevation between the pond and the well bottom causes a reverse flow or so-called siphon flow from the pond or body of water back into the well bottom. In some instances this may be beneficial, but in most instances it is deemed highly disadvantageous.

For proper operation and to preclude such reverse flow, various means have been employed, including the use of a valve at the high point of the pipe line, to release air from and to admit atmospheric air to the line when the pressure within the apex of the line is relatively low. The valve closes against discharge of water from the apex of the line. Many such valves have various difficulties such as slow action, leakage, failure promptly to discharge substantially all of the air and sometimes failure to seal properly when air entrance to the pipe line is not desired.

To obviate these difficulties and to obtain additional advantages, there has been provided herein a substantially improved structure.

In a typical installation, the ground surface or datum elevation 6 has a well casing 7 extending to the bottom of a well 8. A force pump 9 at the bottom of the well is driven by a motor 10 through a shaft 11. When energized, the motor 10 drives the pump 9 to withdraw water from the well 8 and to elevate the withdrawn water through a discharge pipe 13 or line under positive pressure. Rising in the pipe 13, the water drives ahead of it air in the previously empty pipe. Above the ground 6 the pumped water flows through a top section 14 to the crest of a levee 16 and then down into a pond 17 or reservoir. The contour of the pipe 13 is like an inverted U from the well bottom, over the top of the levee 16 and through a downsloping section to an outlet 18 within the pond 17, often below the pond surface 19. The high point of the conducting pipe constitutes an apex 21. At the apex 21 a valve 22 pursuant to the invention is connected to the pipe 13.

The valve includes a housing 24 having a wall 26 that is circular-cylindrical about a vertical axis 27. The housing 24 has an annular bottom 28 joined to a fitting 29 having a threaded lower end removably connected to a fitting 30 on the pipe 13 at the apex 21. The wall 26 at its upper end has an outstanding flange 31 receiving fasteners 32, such as bolts and nuts, for removably holding an annular cover 34 in position.

Adjacent the bottom 28 there is, within the housing 24, a bottom seat 36, conveniently a ring of a readily deformable material adapted to cooperate with a lower ball valve 37. This ball valve is usually fabricated with a thin wall of metal, plastic or rubber and is only slightly deformable. The ball has a predetermined specific gravity or weight for its volume. The ball 37 rises in water but falls in air. The lower ball valve 37 is transversely confined in a cage made up of a plurality of upright tubes 39 held in spaced-apart position by a lower, annular stop 41 located a short distance above the seat 36.

In a similar arrangement, except for inverted symmetry, the cover 34 has a central opening 42 bounded by an upper valve seat 43. Cooperating with the seat 43 is an upper ball valve 44 comparable in construction to the lower ball valve 37, usually being of the same diameter and weight. The upper ball valve rises in water but falls when surrounded by air.

Below the upper ball valve 44 to limit its downward motion there is an annular stop 46 secured to the uprights 39 just within or slightly spaced from the wall 26 of the housing and a substantial distance below the upper valve seat 43.

A lever 51 is mounted on a rod 52 extending diametrically across the fitting 29. The rod is counterbored and rotatably supported on the pin ends 53 of a pair of screws 54. The lower end of the lever 51 is of sufficient length and weight so that the lever when unrestrained hangs across the pipe 13 by gravity. The lever at its upper end has a loop carrying a roller cam 56 normally spaced from the lower ball 37 but movable to lift the ball valve 37 from its seat 36. In the rest position the roller 56 is out of contact with the lower ball valve 37, which can then rise and fall as other forces on it change.

Prior to first operation, the pond 17 may be empty and the pipe outlet end 18 is then in air and air occupies the pipe from the end 18 down to the water level in the bottom of the well 8.

For operation, the pump motor 10 is started and the pump 9 withdraws water from the well and discharges such water upwardly through the pipe 13 and through the top section 14 over the apex 21 and into the outlet 18. The water rising and flowing within the pipe 13 displaces air. Such air escapes from the opening 18 if there is no water in the pond 17. But if there is water in the pond substantially submerging the end 18, the air within the pipe then rises through the fitting 29 and lifts the ball valve 37 from its seat 36.

The rising air flows around the lifted ball valve 37, between the ball and the wall 26 of the housing, and flows upwardly. Because of its weight, the upper ball 44 is in a lower position resting on the stop ring 46 a substantial distance below the seat 43. The rising air does not disturb the upper ball because of large clearances available and so flows around the upper ball valve 44 and out through the opening 42 to the atmosphere. As the air discharges, the following water rises in the fitting 29.

The rising water maintains the lower ball valve 37 lifted, partly due to the buoyant nature of the ball and partly due to the upward velocity of the water flow. Water passes the ball 37, rises within the housing 24 and encounters the upper ball 44. The rising water within the housing 24 lifts the upper, buoyant ball 44 until the ball contacts the valve seat 43. Flow to and through the opening 42 is blocked and no water can escape to the atmosphere. The normal operating condition of the structure is with the lower ball valve 37 off of its seat and with the upper ball valve 44 pressed upward against its seat 43.

When the operating system is shut down by stopping the drive motor 10 and the pump 9, the forces then prevailing tend to make the water flow or siphon in the opposite or backward direction through the pipe 13 because the elevation of the water at the bottom of the well is substantially below the water level in the pond 17.

Figure 2:
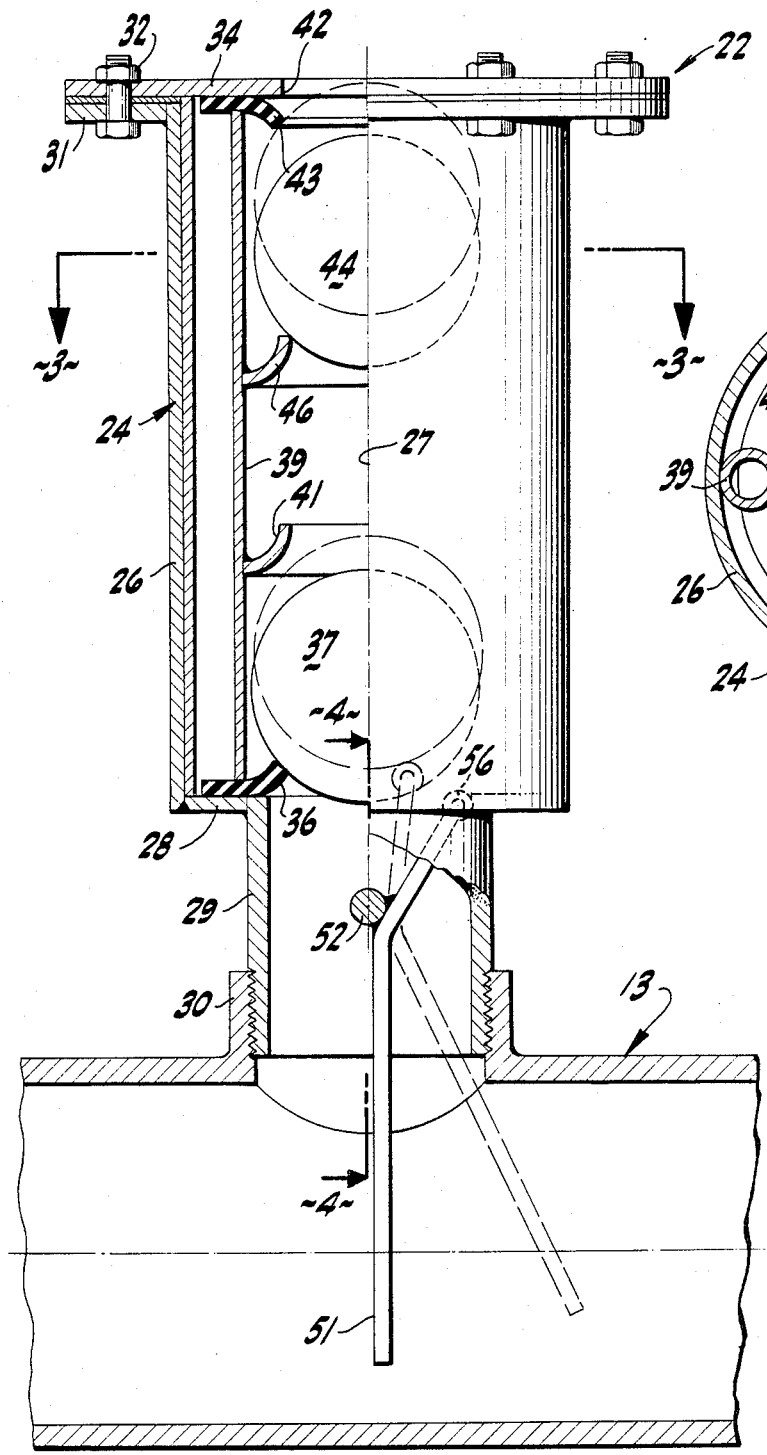
FIG. 2 is, on the right half, a side elevation of a valve structure pursuant to the invention and is, on the left half, a cross-section on an axial plane of the symmetrical valve structure as installed on a pipe line.
Figure 3:
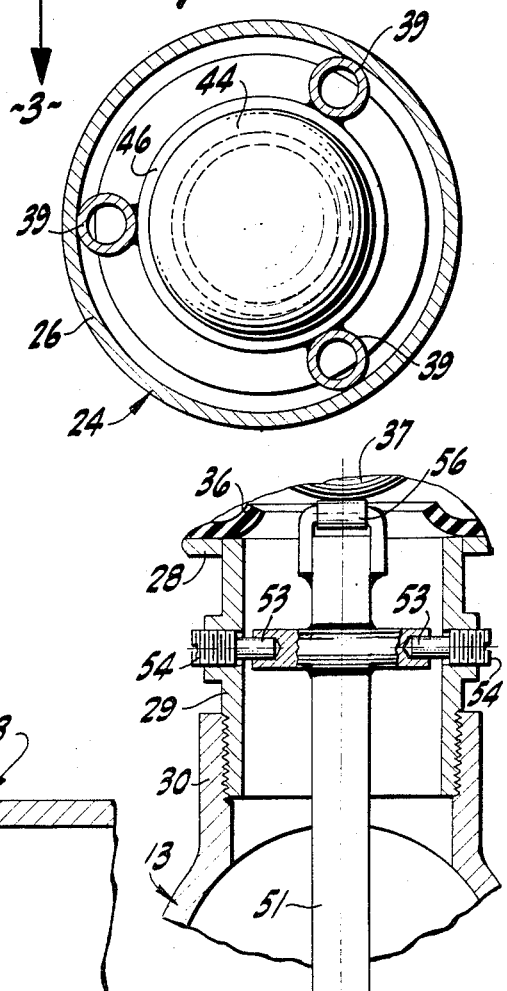
FIG. 3 is a cross-section, the plane of which is indicated by the line 3—3 of FIG. 2.
Figure 4:
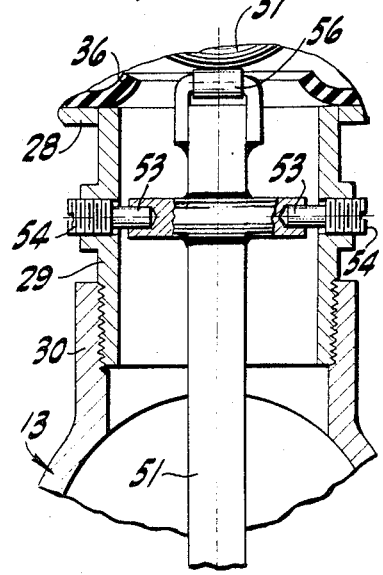
FIG. 4 is a cross-section of a pivot mounting detail, the plane of section being indicated by the line 4—4 of FIG. 2.

When backflow commences, the back-flowing water acts against the depending end of the lever 51 and moves the lever in an anticlockwise direction, as seen in FIG. 2, about the axis of the rod 52. This moves the roller cam 56 against the bottom portion of the ball 37 and either keeps the lower ball from seating or unseats the lower ball valve 37. The previously contained water readily flows out of the housing 24 into the pipe as the upper ball valve 44, being unsupported, falls away from the upper valve seat 43 and admits air from the atmosphere through the opening 42. The valve housing 24 is thus emptied of water during the start of reverse flow. Air is admitted at the apex 21 to the pipe line. Water in the pipe between the valve 22 and the outlet 18 is emptied into the pond. Water also flows from the apex 21 through the remainder of the pipe to the well. The pipe line again contains air in the portion thereof above the water level of the pond and above the water level in the well. There is no siphoning from the pond into the well.

Upon restarting of the motor 10 and the pump 9, the initial cycle repeats. The pipe line fills with liquid, expelling the air through the ball valves 37 and 44 in the housing 24 until the upper ball valve 44 is seated.

Figure 5:
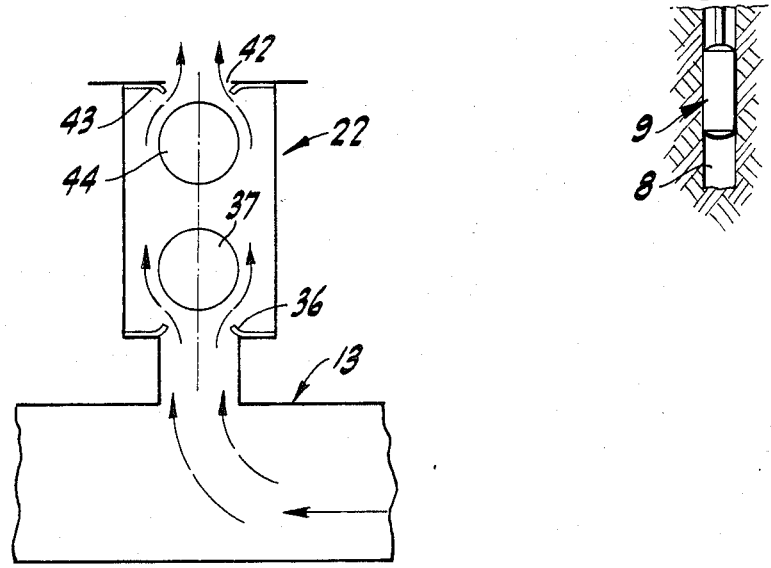
FIGS. 5, 6, 7 and 8 are diagrams showing working portions of the structure in various working positions.

The operational sequences are diagrammed in FIGS. 5-8 with some mechanical parts being omitted. As shown in FIG. 5, the pipe line 13 is in initial operation and the contained air, rising through the fitting 29, has unseated the lower ball valve 37. The actual flow area between the valve 37 and the seat 36 is small but is exaggerated in the drawing for clarity. The rising air flows through the housing 24 and escapes to the atmosphere around the upper ball valve 44 and through its seat, since the ball valve normally rests a substantial distance below the upper seat and so provides a large area for flow between the open valve 44 and the seat. The pressure difference between the inside of the housing and the atmosphere consequently is too small to lift and seat the ball valve.

Figure 6:
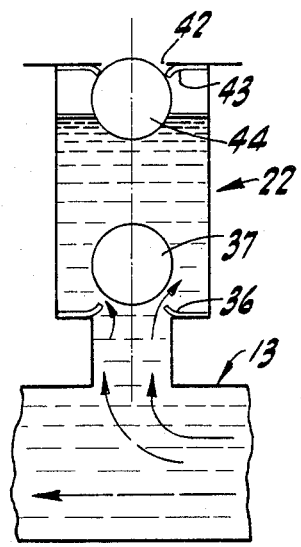

As the air is being expelled, the water flows upwardly through the lower seat 36 and upwardly within the housing 24 until the buoyant upper ball valve is lifted onto the upper seat 43 and blocks further outflow. The lower ball valve 37, being buoyant, stays off the lower seat 36 as shown in FIG. 6, which is the position of the parts during normal pumping.

When pumping stops, the pressure within the pipe apex 21 falls and backflow begins. The lower ball valve is drawn down onto the lower seat with some downflow of water from the housing 24. The dropping of the upper ball valve and admission of atmospheric air is illustrated in FIG. 7.

Figure 7:
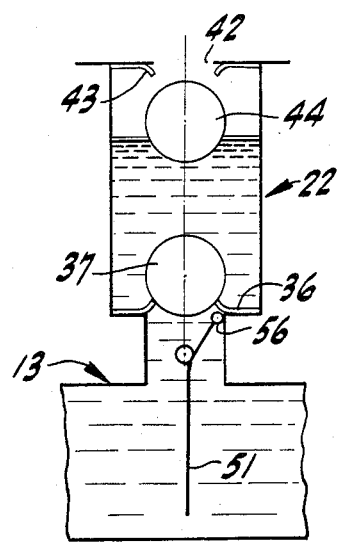
Figure 8:
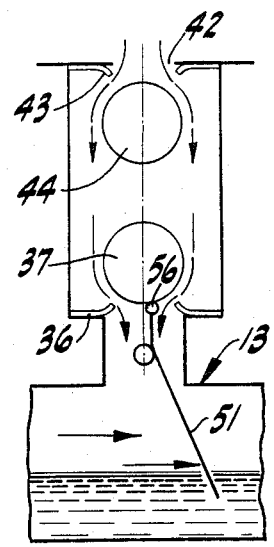

If the lower ball valve has seated and as backflow continues, the lever 51 is rotated by the backflowing water from the FIG. 7 position into the FIG. 8 position. This lever motion mechanically unseats the lower ball valve 37, allowing any water remaining in the casing to flow downwardly and allowing the admission of atmospheric air to the apex of the pipe line. This stops any siphoning action. When the water has stopped backflowing, the lever moves by gravity to its downward position, removing the cam roller from contact with the lower ball valve and permitting that ball valve to seat by gravity until it is again unseated during subsequent air discharge when pumping is again started.

There has thus been provided a simple, economical valve which is readily installed at the apex of a pipe line by standard means and which operates effectively to preclude backflow or siphoning from a pond to a lower well and closes automatically when water is being delivered from the well to the pond.

I claim:

1. An air release and anti-siphon valve comprising a housing having an axis adapted to be disposed vertically, means at the bottom of said housing and including a first opening to the apex of a fluid line and to the interior of said housing, a first valve seat within said housing and surrounding said first opening, means at the top of said housing and including a second opening to the atmosphere and to the interior of said housing, a second valve seat within said housing and surrounding said second opening, a first ball valve within the lower part of said housing and movable between a position on said first valve seat and blocking said first opening and another position off of said first valve seat and unblocking said first opening, a second ball valve within the upper part of said housing and movable between a position on said second valve seat and blocking said second opening and another position off of said second valve seat and unblocking said second opening, means for mechanically lifting said first ball valve from said first valve seat, said lifting means including a lever adapted to extend through said first opening into and at least part way across said fluid line and into said housing, and means for pivoting said lever on said housing for lifting movement by one end of said lever against said first ball valve.

* * * * *